United States Patent
Murade (10) Patent No.: US 7,671,363 B2
(45) Date of Patent: Mar. 2, 2010

(54) ELECTRO-OPTICAL DEVICE AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 11/820,318

(22) Filed: Jun. 19, 2007

(65) Prior Publication Data

US 2007/0296050 A1    Dec. 27, 2007

(30) Foreign Application Priority Data

Jun. 27, 2006  (JP) .............................. 2006-176304

(51) Int. Cl.
*H01L 29/10* (2006.01)
(52) U.S. Cl. .................. 257/57; 257/E29.282; 349/152
(58) Field of Classification Search .................. 257/57, 257/E29.282; 349/152
See application file for complete search history.

(56) References Cited

U.S. PATENT DOCUMENTS 6,897,932 B2 *  5/2005  Murade et al. .............. 349/151
6,930,745 B1 *  8/2005  Miyazaki et al. ........... 349/153
2004/0252269 A1 * 12/2004  Murade ...................... 349/149

FOREIGN PATENT DOCUMENTS

| JP | 10-253990 A | 9/1998 |
| JP | 2003255853 | * 9/2009 |

* cited by examiner

*Primary Examiner*—Wael Fahmy
*Assistant Examiner*—John C Ingham
(74) *Attorney, Agent, or Firm*—AdvantEdge Law Group, LLC (57) ABSTRACT

In at least one embodiment of the disclosure, an electro-optical device includes a peripheral circuit wiring arranged in a peripheral area located peripheral to a pixel area. The peripheral circuit wiring has overlapping portions that overlap vertical conduction terminals in plan view. The overlapping portions are arranged on a lower layer side relative to the vertical conduction terminals. An insulating film electrically insulates the overlapping portions of the peripheral circuit wiring from the vertical conduction terminals.

9 Claims, 9 Drawing Sheets

ELECTRO-OPTICAL DEVICE AND ELECTRONIC APPARATUS

BACKGROUND

1. Technical Field

The present invention relates to electro-optical devices, such as liquid crystal devices, and electronic apparatuses, such as liquid crystal projectors, including the electro-optical devices.

2. Related Art

As disclosed in Japanese Unexamined Patent Application Publication No. 10-253990, an electro-optical device includes a pair of a counter substrate and an element substrate sealed together by a seal member with an electro-optical material sandwiched therebetween. In a peripheral area located around a pixel area on the element substrate, for example, vertical conduction terminals are arranged at four corners of the counter substrate and are arranged away from a seal area in which the seal member is arranged. In addition, conduction members, which are electrically connected to the vertical conduction terminals and which are arranged between the counter substrate and the element substrate so as to correspond to the vertical conduction terminals, are used so that electrical conduction between the pair of the counter substrate and the element substrate is enabled.

In the peripheral area on the element substrate, a peripheral circuit section for driving a plurality of pixel units arranged in the pixel area is provided. Furthermore, peripheral circuit wiring is arranged so as to extend from one end to the other end thereof, and the wiring is electrically connected to the peripheral circuit section at at least one of the one end and the other end thereof. On the element substrate, the peripheral circuit wiring is disposed away from portions in which the vertical conduction terminals are arranged.

Accordingly, with the configuration described above, since portions around the vertical conduction terminals in which the peripheral circuit wiring is arranged need to be designed as patterns taking arrangement of the vertical conduction terminals into consideration, a degree of freedom of design is limited. In addition, in the peripheral area on the element substrate corresponding to the corners of the counter substrate, since it is necessary to ensure an area in which the vertical conduction terminals are to be arranged and an area in which the peripheral circuit wiring is to be arranged, it is difficult to make the peripheral area on the element substrate smaller.

Since a width of a gap between the element substrate and the counter substrate should be uniform, the vertical conduction terminals are preferably arranged at the four corners of the counter substrate. If a configuration in which the vertical conduction terminals are arranged at any of the four corners of the counter substrate for arrangement of the peripheral circuit wiring is adopted, portions of the gap between the element substrate and the counter substrate in positions in which the vertical conduction terminals are arranged and portions of the gap between the element substrate and the counter substrate in positions in which no vertical conduction terminals are arranged are different from each other. Differences in the width of the gap may lead to deterioration of display.

SUMMARY

An advantage of some aspects of the invention is that it provides an electro-optical device capable of displaying a high-quality image and capable of being miniaturized and an electronic apparatus including the electro-optical device.

In accordance with an embodiment of the invention, there is provided an electro-optical device including a pair of a counter substrate and an element substrate arranged so as to face each other, a plurality of pixel electrodes arranged in a pixel area on the element substrate, a counter electrode arranged on the counter substrate so as to face the pixel electrodes, a peripheral circuit section which is arranged in a peripheral area located peripheral to the pixel area and which is used for driving the plurality of pixel electrodes, vertical conduction terminals which are arranged in the peripheral area on the element substrate and which enable electrical conduction between the counter substrate and the element substrate, and peripheral circuit wiring which is arranged in the peripheral area on the element substrate, and which has overlapping portions overlapping the vertical conduction terminals on the element substrate in plan view, the overlapping portions being arranged on a lower layer side relative to the vertical conduction terminals.

Accordingly, when the electro-optical device is driven and pixels are driven by the peripheral circuit section, voltages defined in accordance with potentials of the pixel electrodes and the counter electrode are applied to liquid crystal as an example of electro-optical material sandwiched between the pair of the counter substrate and the element substrate. This enables control of orientation state of the liquid crystal for individual pixels. Since the counter electrode are electrically connected to the vertical conduction terminals arranged in the peripheral area on the element substrate by means of electrical conduction between the counter substrate and the element substrate, the counter electrode are maintained to have a predetermined potential.

The peripheral circuit section is electrically connected to the peripheral circuit wiring arranged on the peripheral area on the element substrate. The vertical conduction terminals are arranged in plan view so as to be overlapped on the overlapping portions of the peripheral circuit wiring on the element substrate. The overlapping portions of the peripheral circuit wiring are arranged on a lower layer side relative to the vertical conduction terminals on the element substrate.

Accordingly, in the peripheral area on the element substrate, the peripheral circuit wiring may be arranged in portions where the vertical conduction terminals are arranged. Therefore, in the portions where the vertical conduction terminals are arranged on the element substrate, space necessary for arranging the vertical terminals and the peripheral circuit wiring may be made smaller when compared with the case described in Japanese Unexamined Patent Application Publication No. 10-253990. Consequently, the peripheral area on the element substrate may be made smaller. Furthermore, even if the peripheral area is made smaller, the peripheral circuit wiring may be arranged without taking arrangement of the vertical conduction terminals into consideration, that is, without changing a design of the arrangement of the vertical conduction terminals. Accordingly, a degree of freedom of arrangement of the vertical conduction terminals and the peripheral circuit wiring may be ensured.

Consequently, the liquid crystal device of the invention may be easily miniaturized. Furthermore, even when the liquid crystal device is miniaturized, generation of display defects due to the uneven gap portions as described above may be prevented and high-quality images may be displayed.

The electro-optical device may further include lines and electronic elements which are arranged on a lower layer side relative to the pixel electrodes and are used for driving the pixel electrodes. The vertical conduction terminals are formed of a conductive film which is the same layer as a first conductive film selected from a plurality of conductive films forming the lines and the electronic elements. The overlapping portions of the peripheral circuit wiring are formed of a conductive film which is the same layer as a second conductive film which is selected from the plurality of conductive films and arranged on a lower layer side relative to the first conductive film.

Accordingly, in the fabrication process of the liquid crystal device, at least the overlapping portions, in which the vertical conduction terminals are overlapped on the peripheral circuit wiring in the peripheral area, are arranged along with the first conductive film and the second conductive film. The number of steps of the fabrication process may be reduced, and accordingly, the fabrication process may be simplified. Note that the "same layer" described herein is a film formed simultaneously with a specific film in the fabrication process and those films are the same type of film.

In a configuration in which the vertical conduction terminals described above are formed of the same layer as that forming the first conductive film and the overlapping portions of the peripheral circuit wiring are formed of the same layer as that forming the second conductive film which is arranged on the lower layer side relative to the first conductive film, the first conductive film and the second conductive film may be a metal film.

In this case, each of at least the overlapping portions formed of the same layer as that forming the second film and the vertical conduction terminals formed of the same layer as that forming the first film may have comparatively low electric resistance. Note that the "metal film" described herein is a conductive film formed of a conductive material including a metal such as an aluminum.

The electro-optical device may further include lines and electronic elements which are arranged on a lower layer side relative to the pixel electrodes and are used for driving the pixel electrodes. The vertical conduction terminals may be formed of films, each of which is the same layer as that forming each of the pixel electrodes. The overlapping portions of the peripheral circuit wiring may be formed of a conductive film which is the same layer as any one of conductive films forming the lines and the electronic elements.

Accordingly, in the fabrication process of the electro-optical device, on the element substrate, at least the overlapping portions, in which the vertical conductive terminals are overlapped on the peripheral circuit wiring, may be made along with the pixel electrodes and any one of a plurality of conductive film arranged on a lower layer side relative to the pixel electrodes. Consequently, the number of steps of the fabrication process may be reduced, and accordingly, the fabrication process may be simplified.

The electro-optical device may further include a counter-electrode potential line which is arranged in the peripheral area on the element substrate, to which a counter-electrode potential used to maintain the counter electrode at a predetermined potential is supplied, and which has connection portions electrically connected to at least the vertical conduction terminals each of the connection portions being formed of the same layers as that forming each of the vertical conduction terminals.

Accordingly, the counter-electrode potential line is arranged in the peripheral area on the element substrate and the counter-electrode potential line has a first end and a second end. The counter-electrode potential line has connection portions on the second end side and the connection portions are electrically connected to the vertical conductive terminals. When the electro-optical device is driven, counter electrode potentials are supplied to the vertical conductive terminals through the connection portions on the second end side of the counter-electrode potential line. Since electrical vertical conduction is enabled, the counter electrode have predetermined potentials based on the counter electrode potentials.

In this case, in the fabrication process of the electro-optical device, at least the connection portions of the counter-electrode potential line may be formed along with the vertical conductive terminals. Accordingly, the number of steps of the fabrication process may be reduced, and therefore, the fabrication process may be simplified.

At least the connection portions of the counter-electrode potential line are formed of the same layer as that forming the vertical conductive terminals. That is, the connection portions of the counter-electrode potential line are arranged in a layer different from that including at least the overlapping portions of the peripheral circuit wiring. Accordingly, at portions where the vertical conduction terminals are arranged on the element substrate, spaces necessary for arranging the connection portions of the counter-electrode potential line and the peripheral circuit wiring may be smaller, and the peripheral circuit wiring may be arranged without taking the arrangement of the connection portions of the counter-electrode potential line into consideration.

The electro-optical device may further include a counter-electrode potential line which is arranged in the peripheral area on the element substrate, to which a counter-electrode potential used to maintain the counter electrode at a predetermined potential is supplied, and which have connection portions electrically connected to at least the vertical conduction terminals each of the connection portions being arranged on a lower layer side relative to the vertical conduction terminals. The connection portions of the counter-electrode potential line may be electrically connected to the vertical conduction terminals through contact holes which penetrates through an interlayer insulation film used for insulation between the connection portions and the vertical conduction terminals.

Accordingly, a pattern of each of the vertical conduction terminals may be formed as an island shape so as to be separated from the corresponding one of connection portions of the counter-electrode potential line in plan view. Consequently, when this configuration is compared with the configuration in which the connection portions of the counter-electrode potential line are formed of the same layer as those forming the vertical conduction terminals and are arranged in the same layer as that including the vertical conduction terminals, the vertical conduction terminals have lower electrical resistance.

In this embodiment, in the peripheral area on the element substrate, at least the connection portions of the counter-electrode potential line may be arranged in a layer which is the same as that including at least the overlapping portions of the peripheral circuit wiring or may be arranged in a layer which is different from that including at least the overlapping portions of the peripheral circuit wiring.

In the configuration described above in which the connection portions of the counter-electrode potential line are arranged on the lower layer side relative to the vertical conduction terminals, at least the connection portions of the counter-electrode potential line may be arranged in a layer different from that including the overlapping portions of the peripheral circuit wiring.

In this case, at portions where the vertical conduction terminals are arranged on the element substrate, spaces necessary for arranging the connection portions of the counter-electrode potential line and the peripheral circuit wiring may be made smaller, and the peripheral circuit wiring may be arranged without taking the arrangement of the connection portions of the counter-electrode potential line into consideration.

In the configuration described above in which the connection portions of the counter-electrode potential line are arranged in a layer different from that including the peripheral circuit wiring, at least the connection portions of the counter-electrode potential line may be arranged on a upper layer side relative to the overlapping portions of the peripheral circuit wiring.

In this case, since the connection portions of the counter-electrode potential line are interposed between the vertical conduction terminals and the overlapping portions of the peripheral circuit wiring in the vertical direction of sectional portions in positions where the vertical conduction terminals are arranged on the element substrate, the following advantages may be obtained. In a step where a counter substrate and an element substrate are sealed together in a fabrication process of an electro-optical device, vertical conduction members are formed so that counter electrode and vertical conduction terminals are electrically connected to each other, and the counter substrate and the element substrate are sealed together by a seal member in a pressing manner. In this case, since the connection portions of the counter-electrode potential line are interposed between the vertical conduction terminals and the overlapping portions of the peripheral circuit wiring, the vertical conduction materials which are in contact with the vertical conduction terminals are prevented from penetrating through the vertical conduction terminals and further prevented from being brought into contact with the overlapping portions of the peripheral circuit wiring.

In the configuration described above in which the connection portions of the counter-electrode potential line are arranged on the lower layer side relative to the vertical conduction terminals, the electro-optical device may further include lines and electronic elements which are used for driving the pixel electrodes and which are arranged on an lower layer side relative to the pixel electrodes. At least each of the connection portions of the counter-electrode potential line may be made of a film which is the same layer as that selected from a plurality of conductive films used to form the lines and the electronic elements.

In this case, in the fabrication process of the electro-optical device, at least the connection portions of the counter-electrode potential line may be arranged in the peripheral area on the element substrate along with any of a plurality of conductive films arranged on the lower layer side relative to the pixel electrodes. Accordingly, the number of steps in the fabrication process may be reduced, and therefore, the fabrication process may be simplified.

According to another embodiment of the invention, there is provided an electronic apparatus including the electro-optical device described above (and various modifications thereof).

The electronic apparatus includes the electro-optical device described above according to the embodiments of the invention. Accordingly, the electronic apparatus may implement various electronic apparatuses capable of displaying a high-quality image and capable of being miniaturized. Examples of such various electronic apparatuses include a projection display apparatus, a television set, a cellular phone, a personal digital assistance, a word processor, a video-tape recorder having a viewfinder or a monitor directly viewed by a user, a work station, a video phone, a POS (point of sales) terminal, and a touch panel. The electronic apparatus according to the invention may implement a display apparatus utilizing an electrophoresis device such as electronic paper or an electron emission device (such as a field emission display and a conduction electron-emitter display).

Operations and advantages of the invention will be apparent from the descriptions of exemplary embodiments which will be described hereinafter.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the present invention will be described with reference to the accompanying drawings hereinafter. In the embodiments which will be described hereinafter, a liquid crystal device which incorporates driving circuits and employs a TFT active matrix driving method will be taken as an example of an electro-optical device of the embodiments of the invention.

First Embodiment

A first embodiment of an electro-optical device according to the invention will be described with reference to FIGS. 1 to 7.

Figure 1:
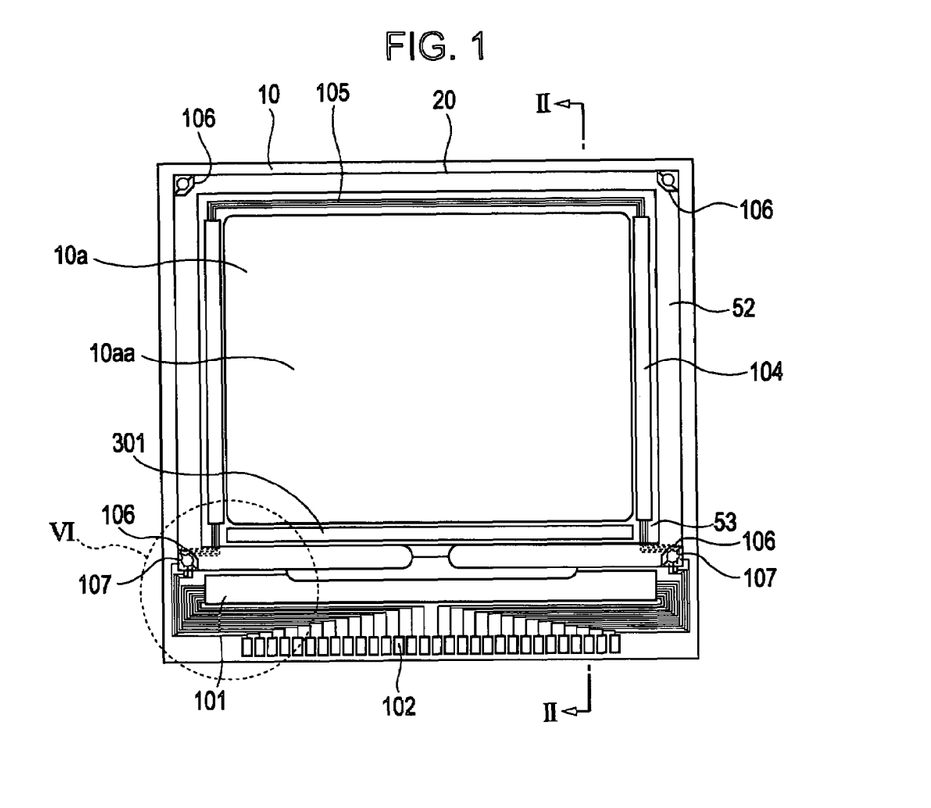
FIG. 1 is a plan view schematically showing a liquid crystal device.
Figure 2:
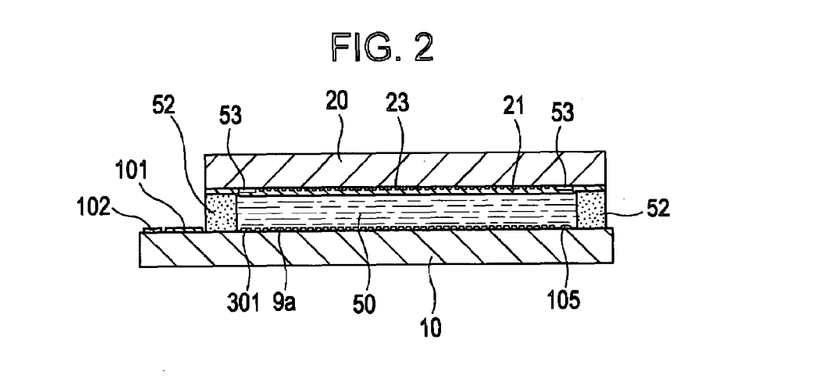
FIG. 2 is a sectional view taken along a line II-II of FIG. 1.

Referring to FIGS. 1 and 2, an entire configuration of a liquid crystal device according to the embodiment will be described. FIG. 1 is a plan view schematically showing the liquid crystal device as viewed from a counter substrate side and which includes a TFT array substrate, which is an example of a "element substrate" according to the invention, and components disposed thereon. FIG. 2 is a sectional view taken along a line II-II of FIG. 1.

In FIGS. 1 and 2, the liquid crystal device includes a TFT array substrate 10 and a counter substrate 20 which faces the TFT array substrate 10. A liquid crystal layer 50 fills a space between the TFT array substrate 10 and the counter substrate 20. The TFT array substrate 10 and the counter substrate 20 are sealed together using a seal member 52 disposed in a seal area located in a periphery of a pixel area 10a.

The seal member 52 is made from an ultraviolet curable resin or thermosetting resin, for example, and is used to seal the TFT array substrate 10 and the counter substrate 20 together. The seal member 52 is applied to the TFT array substrate 10 in the course of fabrication and is cured by being exposed to ultraviolet radiation or by heat treatment. Furthermore, in the seal member 52, gap members (not shown), such as glass fibers or glass beads, which are used to maintain a gap (a gap between substrates) between the TFT array substrate 10 and the counter substrate 20 at a predetermined value are distributed.

A light-shielding frame film 53, which defines a frame area of an image display area 10aa and which has a light shielding effect, is disposed close to the counter substrate 20 and in parallel to an inner side of the seal area in which the seal member 52 is disposed. Note that a portion of or an entire light-shielding frame film 53 may be used as a light-shielding film incorporated in the TFT array substrate 10. In this embodiment, the frame area defined by the light-shielding frame film 53 is arranged on the TFT array substrate 10 so as to be overlapped in a frame shape with a portion of an inner side of the pixel area 10a in plan view. Furthermore, an area defined by the frame area in the pixel area 10a is defined as an effective area which displays an image, that is, the image display area 10aa. An area overlapped on the frame area in the pixel area 10a is a dummy area and pixel units arrayed in the dummy area are dummy pixel units which are used to display, for example, a black area (the lowest grayscale level) as a whole. Accordingly, a frame of an image is displayed in black.

In the peripheral area located in the periphery of the pixel area 10a on the TFT array substrate 10, a "peripheral circuit section" according to the embodiments of the invention includes a data-line driving circuit 101, a sampling circuit 301, scanning-line driving circuits 104, and external-circuit connection terminals 102.

In the peripheral area on the TFT array substrate 10, the data-line driving circuit 101 and the external-circuit connection terminals 102 are disposed outside of the seal area and along a first side of the TFT array substrate 10. The sampling circuit 301 is disposed in the inner side of the seal area and in the peripheral area on the TFT array substrate 10 and along a first side of the image display area 10aa, which is also along the first side of the TFT array substrate 10, so as to be covered with the light-shielding frame film 53.

The scanning-line driving circuits 104 are disposed along two sides of the TFT array substrate 10 which are adjacent to the first side of the TFT array substrate 10 and are disposed so as to be covered with the light-shielding frame film 53. A plurality of lines 105 are arranged along the remaining one side of the TFT array substrate 10 so as to be covered with the light-shielding frame film 53, and are used so that the two scanning-line driving circuits 104, which are disposed on opposite sides of the image display area 10aa, are electrically connected to each other.

Vertical conduction terminals 106 are disposed in areas on the peripheral area on the TFT array substrate 10 which correspond to the four corners of the counter substrate 20. In addition, vertical conduction members 107 are electrically connected to the corresponding vertical conduction terminals 106 in the space between the TFT array substrate 10 and the counter substrate 20.

In FIG. 2, on the TFT array substrate 10, pixel electrodes 9a are arranged over TFTs (Thin Film Transistors) serving as pixel switching elements and wiring including scanning lines and data lines, and a first alignment layer (not shown in FIG. 2) is further disposed over the pixel electrodes 9a. Note that, in this embodiment, the pixel switching elements may be formed of TFTs, various transistors, or TFDs (Thin Film Diodes).

In the image display area 10aa on the counter substrate 20, a lattice-shaped or stripe-shaped light-shielding film 23 is disposed. Furthermore, on the light-shielding film 23 (on the lower side of the light-shielding film 23 in FIG. 2), a counter electrode 21 which face the pixel electrodes 9a through the liquid crystal layer 50 are arranged. Furthermore, a second alignment layer (not shown in FIG. 2) is disposed.

The liquid crystal layer 50 is formed of liquid crystal including one type of or a plurality of types of nematic liquid crystal molecules, and the liquid crystal molecules are in a predetermined orientation state in a space between a pair of the first and second alignment layers. When the liquid crystal device is driven, a voltage is applied to each of the first and second alignment layers whereby a liquid-crystal hold capacitance is generated between the pixel electrodes 9a and the counter electrode 21.

Although not show in the figure, an inspection circuit for checking the quality or defects of the liquid crystal device in the course of fabrication or before shipment may be disposed, in addition to the data-line driving circuit 101 and the scanning-line driving circuits 104, on the TFT array substrate 10.

Figure 3:
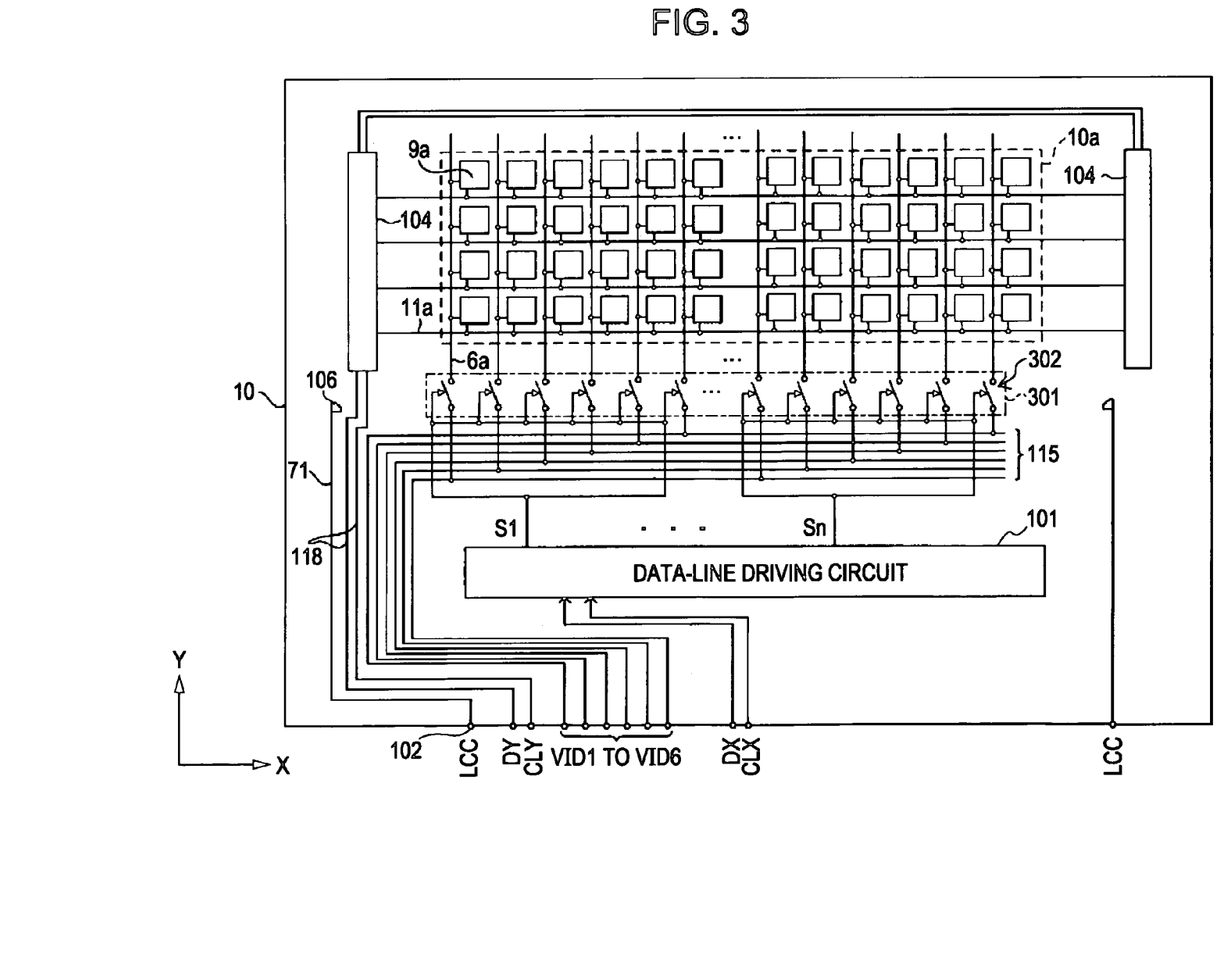
FIG. 3 is a block diagram schematically showing arrangement and electrical connection of various driving circuits in a peripheral area on a TFT array substrate.
Figure 4:
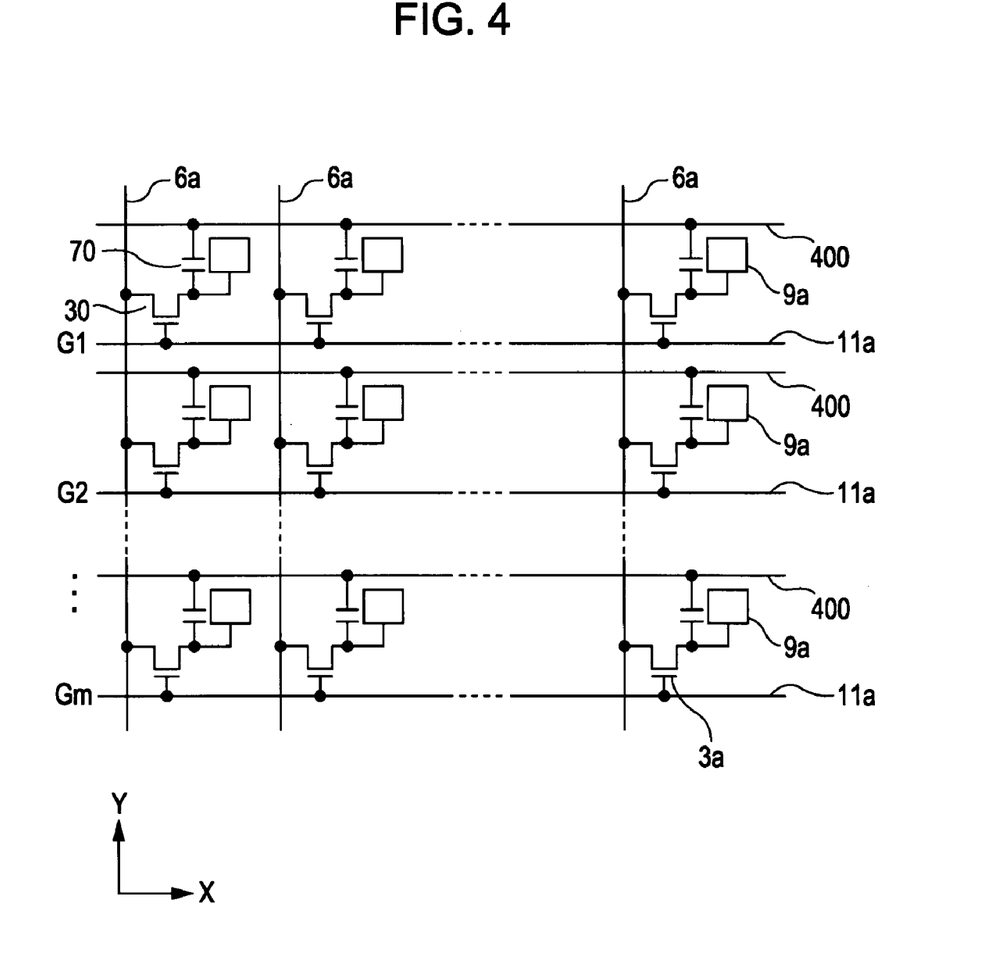
FIG. 4 is a circuit diagram showing an equivalent circuit of various elements and lines in a plurality of pixel units.

Referring to FIGS. 3 and 4, an electrical configuration of the liquid crystal device will be described. FIG. 3 is a block diagram schematically showing arrangement and electrical connection of various driving circuits in the peripheral area of the TFT array substrate 10. FIG. 4 is a circuit diagram showing an equivalent circuit of various devices and lines in a plurality of pixel units.

In FIG. 3, in the pixel area 10a on the TFT array substrate 10, a plurality of pixel electrodes 9a arranged in a matrix, and a plurality of scanning lines 11a and a plurality of data lines 6a arranged so as to intersect with each other are disposed, and furthermore, pixel units, which represent pixels, are arranged at intersections of the scanning lines 11a and the data lines 6a.

In the peripheral area on the TFT array substrate 10, the data-line driving circuit 101, the sampling circuit 301, and the scanning-line driving circuits 104 are disposed and constitute a peripheral circuit section.

For example, Y-clock signals CLY (and inversion Y-clock signals CLYinv which are inversion signals of the Y-clock signals CLY) and Y-start pulses DY are supplied to the scanning-line driving circuits 104 from an external circuit (not shown) through the external-circuit connection terminals 102. When receiving the Y-start pulses DY, the scanning-line driving circuits 104 sequentially generate and output scanning signals in a timing in accordance with the Y-clock signals CLY and the inversion Y-clock signals CLYinv.

In this embodiment, X-clock signals CLX (and inversion X-clock signals CLXinv which are inversion signals of the X-clock signals CLX) and X-start pulses DX are supplied to the data-line driving circuit 101 from an external circuit (not shown) through the external-circuit connection terminals 102. When receiving the X-start pulses DX, the data-line driving circuit 101 sequentially generates and outputs sampling circuit driving signals S1 to Sn in a timing in accordance with the X-clock signals CLX and the inversion X-clock signals CLXinv.

The sampling circuit 301 includes a plurality of sampling switches 302 constituted by P-channel or N-channel TFTs or complementary TFTs. Image signals VID1 to VID6 are supplied to the sampling circuit 301 from an external circuit through the external-circuit connection terminals 102 and image signal lines 115. For example, six image signal lines 115 are provided so as to correspond to the image signals VID1 to VID6 which are subjected to serial-parallel conversion in six phases, that is, subjected to phase evolution, in the external circuit.

The sampling switches 302 are used to supply the image signals VID1 to VID6 to data line groups, each of which includes six data lines 6a, on a group-by-group basis in accordance with sampling circuit driving signals Si (i=1 to n) supplied from the data-line driving circuit 101. In this embodiment, since the plurality of data lines 6a are driven on a group-by-group basis, the magnitude of driving frequency is suppressed.

In FIG. 4, in the pixel area 10a of the liquid crystal device, the pixel electrodes 9a and TFTs 30 performing switch-control on the pixel electrodes 9a are arranged on the plurality of pixel units arranged in a matrix so as to correspond to the intersections of the scanning lines 11a and the data lines 6a. The data lines 6a to which the image signals VIDk (K=1 to 6) are supplied are electrically connected to the sources of the corresponding TFTs 30. Furthermore, gate electrodes 3a are electrically connected to the gates of the corresponding TFTs 30, and the pixel electrodes 9a are electrically connected to the drains of the corresponding TFTs 30.

The scanning lines 11a are line-sequentially selected in accordance with scanning signals G1 to Gm supplied from the scanning-line driving circuits 104. When one of scanning signals Gj (j=1 to m) is supplied through the corresponding gate electrode 3a to the pixel unit corresponding to the selected one of the scanning lines 11a, the TFTs 30 are turned on. Furthermore, the since the TFTs 30 are closed in a predetermined period of time, the image signals VIDk are supplied from the data lines 6a in a predetermined timing. Accordingly, a voltage is applied to the liquid crystal in accordance with potential defined by the pixel electrodes 9a and the counter electrode 21. The liquid crystal is made to perform light modulation and gradation display by changing the orientation and alignment of a molecular assembly of the liquid crystal in accordance with a level of the applied voltage. In a normally white mode, the light transmittance relative to incident light is reduced in accordance with the voltages applied to the liquid crystals in units of pixels, whereas in a normally black mode, the light transmittance relative to incident light is increased in accordance with the voltages applied to the liquid crystals in units of pixels. Accordingly, light having contrast in accordance with the image signals VID1 to VID6 is emitted from the liquid crystal device as a whole.

Here, storage capacitors 70 are additionally arranged in parallel to liquid crystal capacitances generated between the pixel electrodes 9a and the counter electrode 21 so as to prevent the image signals from being leaked. The storage capacitors 70 are arranged along the scanning lines 11a and include capacitor electrodes of fixed potentials and further include capacitor electrodes 300 fixed to constant potentials.

Figure 5:
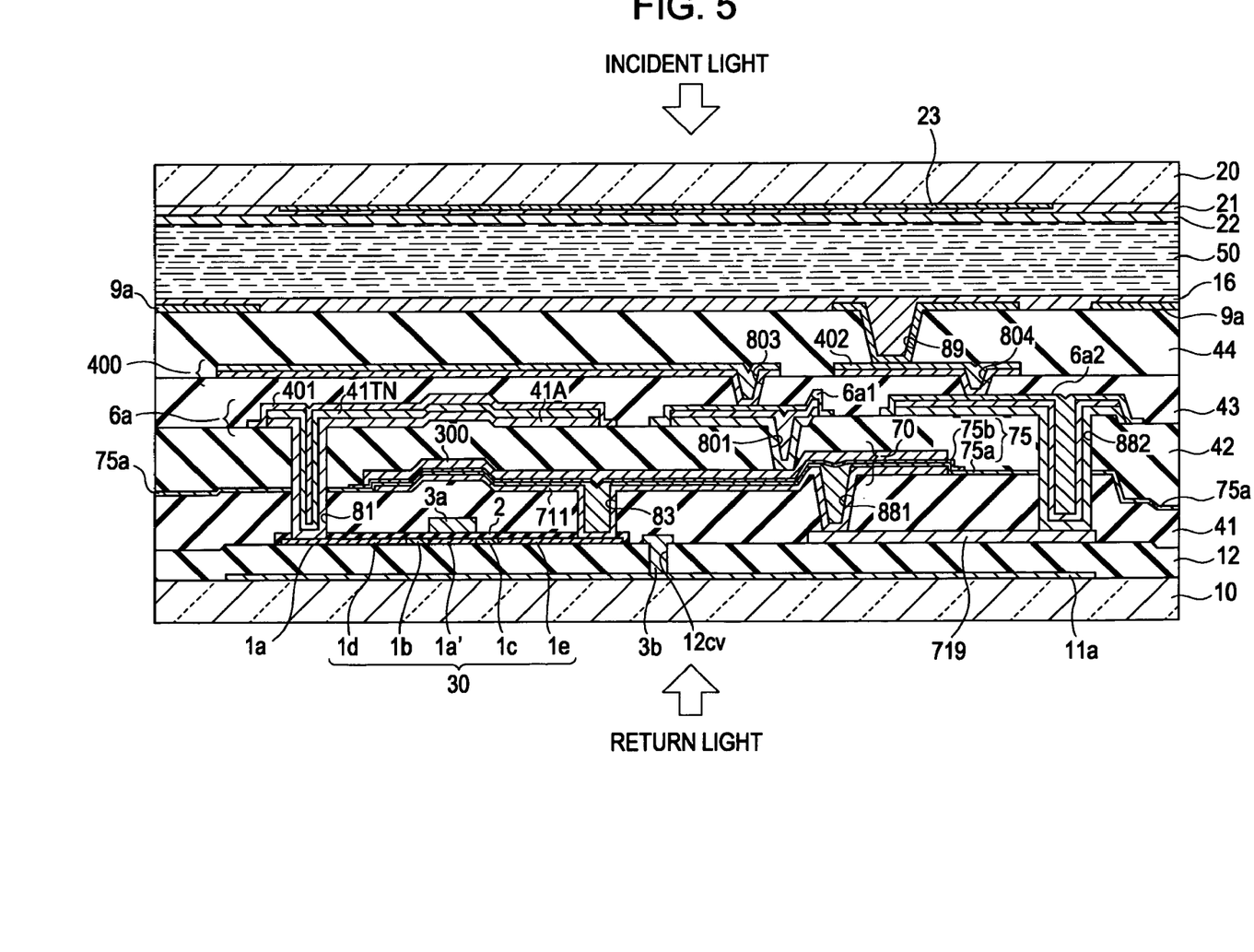
FIG. 5 is a sectional view showing a configuration of a cross-section of each of the pixel units.

A configuration of each of the pixel units which implements an operation described with reference to FIGS. 3 and 4 will now be described in detail with reference to FIG. 5. FIG. 5 is a sectional view illustrating a configuration of a sectional portion of each of the pixel units. Note that since layers and members should be visible for explanation in FIG. 5, the sizes of the layers and members are reduced to different scales. This is also true for layers and members in FIG. 6 onward and the scales of the same layers or members may be different between the figures.

In FIG. 5, a description is made for each of the pixel units. In FIG. 5, the liquid crystal device includes the TFT array substrate 10 which is a quartz substrate, a glass substrate, or a silicone substrate, and the counter substrate 20 which is a glass substrate or a quartz substrate and which is disposed so as to face the TFT array substrate 10.

A layer of the pixel electrodes 9a is arranged on the TFT array substrate 10 side, and an alignment layer 16 which is subjected to a predetermined alignment process such as a rubbing process is arranged on the layer of the pixel electrodes 9a. The pixel electrodes 9a are formed of transparent conductive films such as ITO (Indium Tin Oxide) films. On the other hand, the counter electrode 21 are arranged on the counter substrate 20 side and on an alignment layer 22 which is subjected to a predetermined alignment process such as a rubbing process. As with the pixel electrodes 9a, the counter electrode 21 are made of transparent conductive films such as ITO films.

The liquid crystal layer 50 including electro-optical materials such as liquid crystal is formed in a space enclosed by the seal member 52 (refer to FIGS. 1 and 2) and between the TFT array substrate 10 and the counter substrate 20 which faces the TFT array substrate 10. The liquid crystal layer 50 is in a predetermined orientation state between the alignment layers 16 and 22 when no electric fields are applied from the pixel electrodes 9a.

On the TFT array substrate 10, various layers constitute a laminated structure in addition to the layer of the pixel electrodes 9a and the alignment layer 16. The laminated structure will be described hereinafter starting from the bottom of the laminated structure.

As a first layer, a layer of the scanning lines 11a is arranged on the TFT array substrate 10, and an underlying insulation film 12 is arranged on the layer of the scanning lines 11a.

As a second layer, a layer of the TFTs 30 including the gate electrodes 3a is arranged on the underlying insulation film 12. Each of the TFTs 30 has an LDD (Lightly Doped Drain) structure and includes the gate electrode 3a, a channel region 1a' on which a channel is formed due to an electric field applied from the gate electrode 3a, and an insulation film 2 including a gate insulation film used to insulate the gate electrode 3a and a semiconductor layer 1a. Furthermore, the semiconductor layer 1a includes a low-concentration source region 1b, a low-concentration source drain region 1c, a high-concentration source region 1d, and a high-concentration drain region 1e. The second layer also includes a relaying electrode 719 formed of the same film forming the gate electrode 3a.

In FIG. 5, a contact hole 12cv is formed in the underlying insulation film 12. The entire underlying insulation film 12 is covered with the gate electrode 3a having a side-wall portion 3b integrally formed therewith.

Furthermore, a first interlayer insulation film 41 is arranged on the TFT 30, the gate electrode 3a, and the relaying electrode 719 arranged on the TFT array substrate 10. The first interlayer insulation film 41 includes a contact hole 81 used to electrically connect the high-concentration source region 1d of the TFT 30 to the corresponding data line 6a which will be described later. The contact hole 81 is a through hole penetrating through a second insulation film 42 which will be described later. The first interlayer insulation film 41 further includes a contact hole 83 used to electrically connect the high-concentration drain region 1e of the TFT 30 to a lower electrode 711 serving as the storage capacitor 70. The first interlayer insulation film 41 yet further includes a contact hole 881 used to electrically connect the lower electrode 711, which serves as a capacitor electrode on the pixel electrode side and which constitutes the storage capacitor 70, to the relaying electrode 719. In addition, the first interlayer insulation film 41 includes a contact hole 882 used to electrically connect the relaying electrode 719 to a second relaying electrode 6a2. The contact hole 882 is a through hole penetrating through a second interlayer insulation film 42 which will be described later.

The storage capacitor 70 is arranged as a third layer laminated on the first interlayer insulation film 41. The storage capacitor 70 includes the lower electrode 71 which serves as a capacitor electrode on the pixel potential side and which is connected to the corresponding pixel electrode 9a and the capacitor electrode 300 which serves as a capacitor electrode on the fixed potential side. The lower electrode 71 and the capacitor electrode 300 are arranged so as to face each other with a dielectric film 75 disposed therebetween.

The lower electrode 71 functions as a capacitor electrode on the pixel potential side and further relays and connects the pixel electrode 9a and the high-concentration drain region 1e of the TFT 30. The capacitor electrode 300 is electrically connected to a capacitor line 400 which has a fixed potential and which will be described later. The dielectric film 75 has a double-layer structure including an oxide silicon film 75a as a lower layer and a silicone nitride film 75b as an upper layer.

The second interlayer insulation film 42 is arranged on the storage capacitor 70. The second interlayer insulation film 42 includes the contact hole 81 which electrically connects the high-concentration source region 1d of the TFT 30 to the data lines 6a. In addition, the second interlayer insulation film 42 includes a contact hole 801 which electrically connects a relaying layer 6a1 for the capacitance line 400 to the capacitor electrode 300 included in the storage capacitor 70 as an upper electrode. The second interlayer insulation film 42 further includes the contact hole 882 which electrically connects the second relaying electrode 6a2 to the relaying electrode 719.

A layer of the data lines 6a as an example of a "lower layer dielectric film" according to this embodiment of the invention is arranged as a fourth layer on the second interlayer insulation film 42. The layer of the data lines 6a has a three-layer structure including, for example, an aluminum layer (a reference symbol 41A in FIG. 5), a titanium nitride layer (a reference symbol 41TN in FIG. 5), and a silicone nitride layer (a reference symbol 401 in FIG. 5) starting from the bottom layer. The fourth layer further includes the relaying layer 6a1 and the second relaying electrode 6a2 formed of films which are the same layer as that forming the data lines 6a.

A third interlayer insulation film 43 is arranged on the layer of the data lines 6a. The third interlayer insulation film 43 includes a contact hole 803 which electrically connects the capacitance line 400 and the relaying layer 6a1 for the capacitance line 400 and includes a contact hole 804 which electrically connects a third relaying electrode 402 and the second relaying electrode 6a2.

A layer of the capacitance line 400 as an example of an "upper layer dielectric film" according to an embodiment of the invention is arranged as a fifth layer on the third interlayer insulation film 43, and the third relaying electrode 402 formed of a film which is the same layer as that forming the capacitance line 400 is arranged. The third relaying electrode 402 relays electrical connection between the second relaying electrode 6a2 and the pixel electrode 9a through a contact hole 89, which will be described later, and the contact hole 804. Here, the layer of the capacitance line 400 and the third relaying electrode 402 has a double-layer structure including an aluminum layer as a lower layer and a titanium nitride layer as an upper layer.

Finally, as a sixth layer, the layer of the pixel electrodes 9a are arranged in a matrix and the alignment layer 16 is arranged on the layer of the pixel electrodes 9a. The layer of the pixel electrodes 9a is arranged on a fourth interlayer insulation film 44. The fourth interlayer insulation film 44 includes the contact hole 89 which electrically connects the corresponding pixel electrode 9a and the third relaying electrode 402. Accordingly, the pixel electrode 9a and the TFT 30 are electrically connected through the contact hole 89, the third relaying electrode 402, the contact hole 804, the second relaying electrode 6a2, the contact hole 882, the relaying electrode 719, the contact hole 881, the lower electrode 71 and the contact hole 83.

The configuration described above is employed for each of the pixel units, and the configurations of the pixel units are formed with predetermined intervals on the pixel area 10a described with reference to FIGS. 1 to 3.

Figure 6:
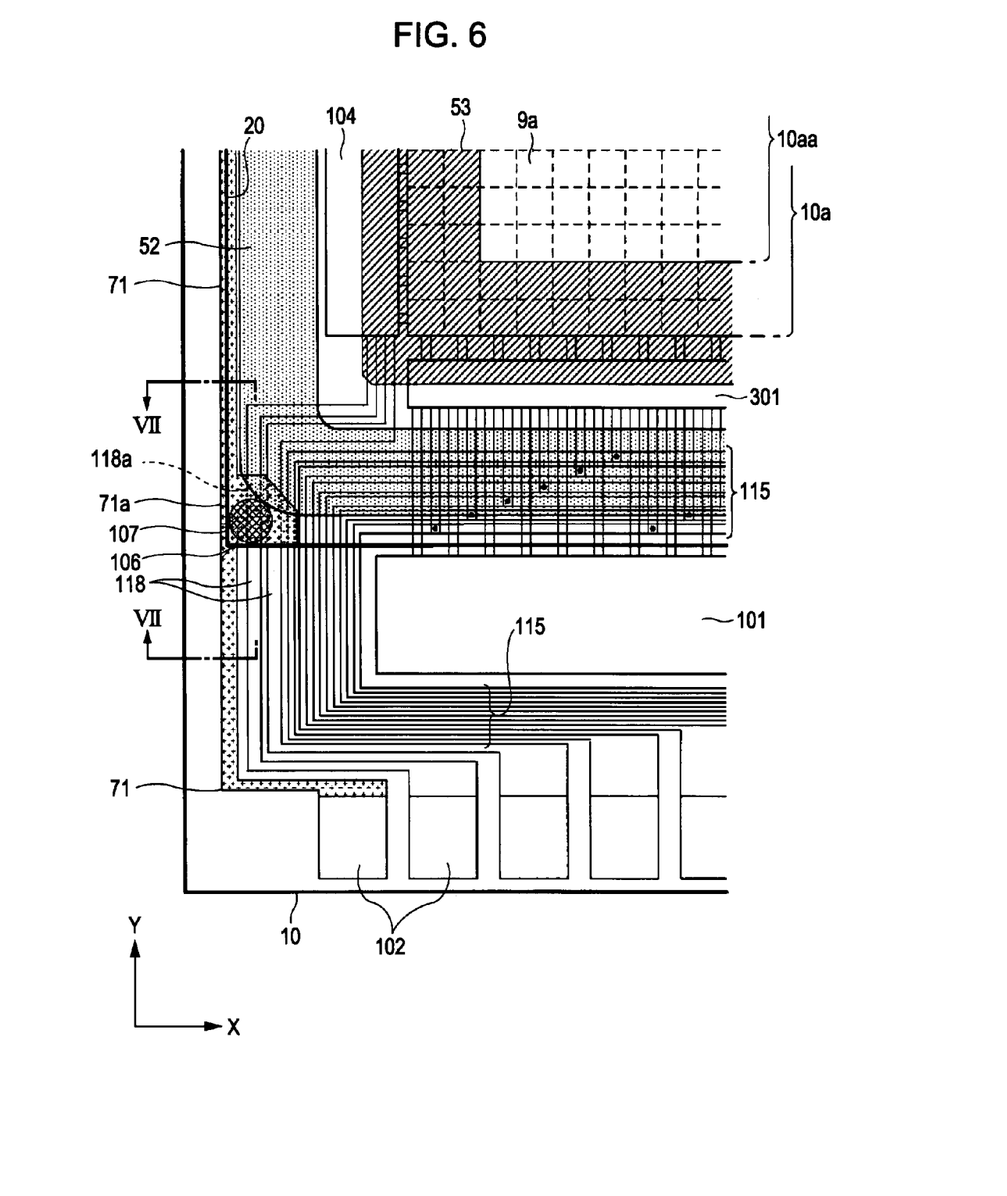
FIG. 6 is an enlarged plan view showing a configuration of a portion surrounded by a dotted line in FIG. 1.
Figure 7:
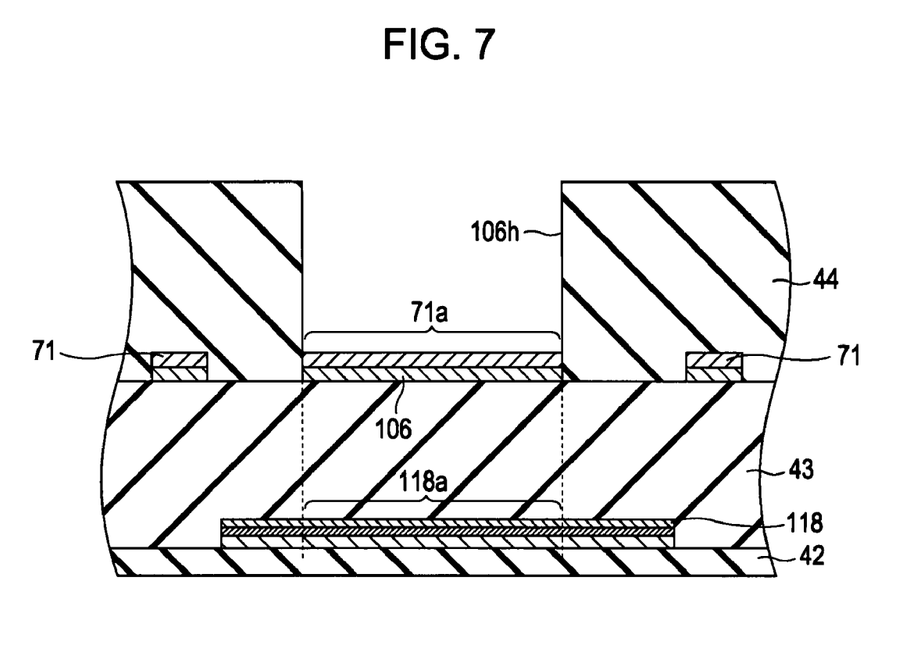
FIG. 7 is a sectional view taken along a line VII-VII of FIG. 6.

Referring to FIGS. 6 and 7, a characteristic configuration of this embodiment will be described in detail. FIG. 6 is an enlarged plan view showing a configuration of a portion surrounded by a dotted line in FIG. 1, and FIG. 7 is a sectional view taken along a line VII to VII in FIG. 6.

As shown in FIG. 6 and shown in FIG. 3 described above, in the peripheral-area on the TFT array substrate 10, the image signal lines 115 and signal lines 118 for the scanning-line driving circuits are arranged as examples of "peripheral circuit wiring" of the embodiments of the invention. Note that FIG. 6 is an enlarged view showing a configuration of a portion VI surrounded by the dotted line in FIG. 1.

Each of the six image signal lines 115 to which the image signals VID1 to VID6 are supplied has one end which is electrically connected to the corresponding external circuit connection terminal 102 and the other end which is electrically connected to the sampling circuit 301, and is arranged so as to surround the data-line driving circuit 101. Furthermore, the six image signal lines 115 are arranged along a direction of an array of the data lines 6a (that is, the X direction) between the data-line driving circuit 101 and the sampling circuit 301.

The signal lines 118 for the scanning-line driving circuits are arranged so as to be used as signal lines for supplying the Y-clock signals CLY (and the inversion Y-clock signals CLY-inv) supplied from the external-circuit connection terminals 102 and the Y-start pulses DY to the scanning-line driving circuits 104 as described with reference to FIG. 3. According to the configurations shown in FIGS. 3 and 6, each of the signal lines 118 for the scanning-line driving circuits has one end which is electrically connected to the corresponding external circuit connection terminal 102 and the other end which is electrically connected to the corresponding scanning-line driving circuit 104, and is arranged in parallel to a portion of the corresponding image signal line 115 among the six image signal lines 115.

The peripheral area on the TFT array substrate 10 further includes a counter-electrode potential line 71 which is arranged so that one end of the counter-electrode potential line 71 is electrically connected to the corresponding external circuit connection terminal 102 and so that the other end is electrically connected to the vertical conduction terminals 106. When the liquid crystal device is driven, counter electrode potentials LCC are supplied from an external circuit through the external-circuit connection terminals 102 to the counter-electrode potential line 71. The supplied counter electrode potentials LCC are further supplied from the counter-electrode potential line 71 to the vertical conduction terminals 106. In this way, vertical and electrical conduction between the counter substrate 20 and the TFT array substrate 10 is enabled since the vertical conduction terminals 106 are electrically connected to the counter electrode 21 through the vertical conduction members 107. The counter electrode potentials LCC are supplied to the counter electrode 21 through the vertical conduction. The counter electrode potentials LCC are used as reference potentials for the counter electrode 21 to properly maintain a potential difference between the pixel electrodes 9*a* and the counter electrode 21 and to generate a hold capacitance of the liquid crystal.

In this embodiment, the vertical conduction terminals 106 are arranged on the TFT array substrate 10 in FIG. 6 so as to be overlapped on the signal lines 118 for the scanning-line driving circuits and the image signal lines 115 in plan view. For example, regarding the arrangement of the vertical conduction terminals 106 and the signal lines 118 for the scanning-line driving circuits, in FIGS. 6 and 7, the vertical conduction terminals 106 are arranged so as to be overlapped on overlapping portions 118*a*, which are portions of the signal lines 118 for the scanning-line driving circuits, on the TFT array substrate 10 in plan view. The overlapping portions 118*a* of the signal lines 118 for the scanning-line driving circuits are arranged on a lower layer side relative to the vertical conduction terminals 106 on the TFT array substrate 10.

In this embodiment, in FIGS. 6 and 7, the vertical conduction terminals 106 are arranged, for example, on an upper layer side relative to the third interlayer insulation film 43, which is in the same layer including the capacitance line 400 in the pixel units, and are formed of the same layer as that used for the capacitance line 400. In this case, as with the capacitance line 400, the vertical conduction terminals 106 have double-layer structures each of which includes an aluminum layer as a lower layer and a titanium nitride layer as an upper layer.

At least the overlapping portions 118*a* of the signal lines 118 for the scanning-line driving circuits are arranged, for example, on an upper layer side relative to the second interlayer insulation film 42, which is in a layer including the data lines 6*a* in the pixel unit, and are formed of the same layer as the film used for the data lines 6*a*. In this case, at least the overlapping portions 118*a* of the signal lines 118 for the scanning-line driving circuits have three-layer structures each of which includes an aluminum layer, a titanium nitride layer, and a silicone nitride layer from the bottom.

Accordingly, in this embodiment, in the fabrication process of the liquid crystal device, at least the overlapping portions 118*a*, in which the vertical conduction terminals 106 are overlapped on the signal lines 118 for the scanning-line driving circuits, may be arranged along with the capacitance line 400 and the data lines 6*a* on the TFT array substrate 10. The number of steps of the fabrication process may be reduced, and accordingly, the fabrication process may be simplified. Furthermore, at least the overlapping portions 118*a* of the signal lines 118 for the scanning-line driving circuits, in which the vertical conduction terminals 106 are overlapped on the signal lines 118 for the scanning-line driving circuits, may be made of a layer including an aluminum, result in comparatively low electric resistance.

The counter-electrode potential lines 71 are electrically connected to the vertical conduction terminals 106 at connection portions 71*a* thereof. On the TFT array substrate 10, at least the connection portions 71*a* of the counter-electrode potential lines 71 are arranged on a layer which is the same as the layer including the vertical conduction terminals 106 and made of the same layer as that used for the vertical conduction terminals 106. As shown in FIGS. 6 and 7, for example, the connection portions 71*a* of the counter-electrode potential lines 71 are integrally formed with the vertical conduction terminals 106.

In this embodiment, in the fabrication process of the liquid crystal device, at least the connection portions 71*a* of the counter-electrode potential lines 71 may be integrally formed with the vertical conduction terminals 106. Accordingly, the number of steps in the fabrication process may be reduced, and therefore, the fabrication process may be simplified. Furthermore, the connection portions 71*a* of the counter-electrode potential lines 71 are arranged on a layer different from at least the layer including the overlapping portions 118*a* of the signal lines 118 for the scanning-line driving circuits. Accordingly, spaces necessary for arranging the connection portions 71*a* of the counter-electrode potential lines 71 and the signal lines 118 for the scanning-line driving circuits may be smaller, and therefore, the signal lines 118 for the scanning-line driving circuits may be arranged without taking the arrangement of the connection portions 71*a* of the counter-electrode potential lines 71 into consideration.

Furthermore, as shown in FIG. 7, openings 106*h* which penetrate through the fourth interlayer insulation film 44 to surfaces of the vertical conduction terminals 106 are formed so that the surfaces of the vertical conduction terminals 106 are exposed from the fourth interlayer insulation film 44 on the upper layer side relative to the vertical conduction terminals 106. In the fabrication process of the liquid crystal device, when the counter substrate 20 and the TFT array substrate 10 are sealed together, the vertical conduction members 107 are arranged at at least portions in the openings 106*h* and are in contact with the surfaces of the vertical conduction terminals 106 which are exposed from the fourth interlayer insulation film 44.

In the embodiment described above, the signal lines 118 for the scanning-line driving circuits and the image signal lines 115 may be arranged at portions where the vertical conduction terminals 106 are arranged on the peripheral area on the TFT array substrate 10. Accordingly, at the portions where the vertical conduction terminals 106 are arranged on the TFT array substrate 10, spaces necessary for arranging the vertical conduction terminals 106 and the signal lines 118 for the scanning-line driving circuits may be made smaller, and therefore the peripheral area on the TFT array substrate 10 may be made smaller. In addition, even when the peripheral area is made smaller, the signal lines 118 for the scanning-line driving circuits may be arranged without taking the arrangement of the vertical conduction terminals 106 into consideration, that is, without changing the design of the arrangement of the vertical conduction terminals 106. Accordingly, a degree of freedom of arrangement of the vertical conduction terminals 106 and the signal lines 118 for the scanning-line driving circuits may be ensured.

Consequently, the liquid crystal device may be easily miniaturized. Furthermore, even when the liquid crystal device is miniaturized, generation of display defects due to the uneven gap portions as described above may be prevented and high-quality images may be displayed.

Second Embodiment

An electro-optical device according to a second embodiment of the invention will now be described. The descriptions for the same portions in the second embodiment as those in the first embodiment are omitted and the same reference symbols are used for the same components having the same function as those described in the first embodiment, and only different portions are described with reference to FIGS. 8 and 9. Note that the same components as those in the first embodiment may be described with reference to FIGS. 1 to 7.

Figure 8:
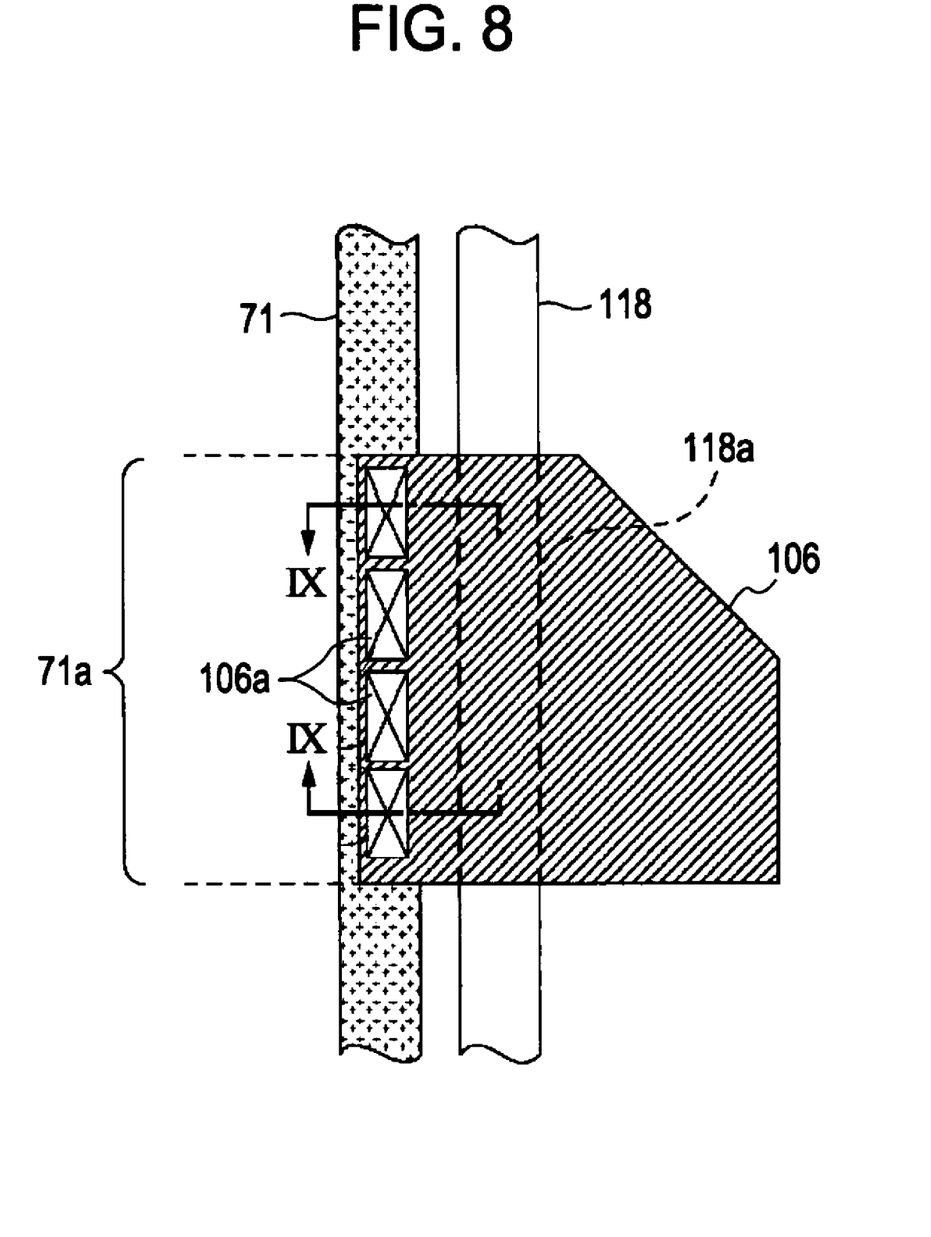
FIG. 8 is a plan view schematically showing a pattern and arrangement of a vertical conduction terminal, a counter-electrode potential line, and a signal line of a scanning-line driving circuit.
Figure 9:
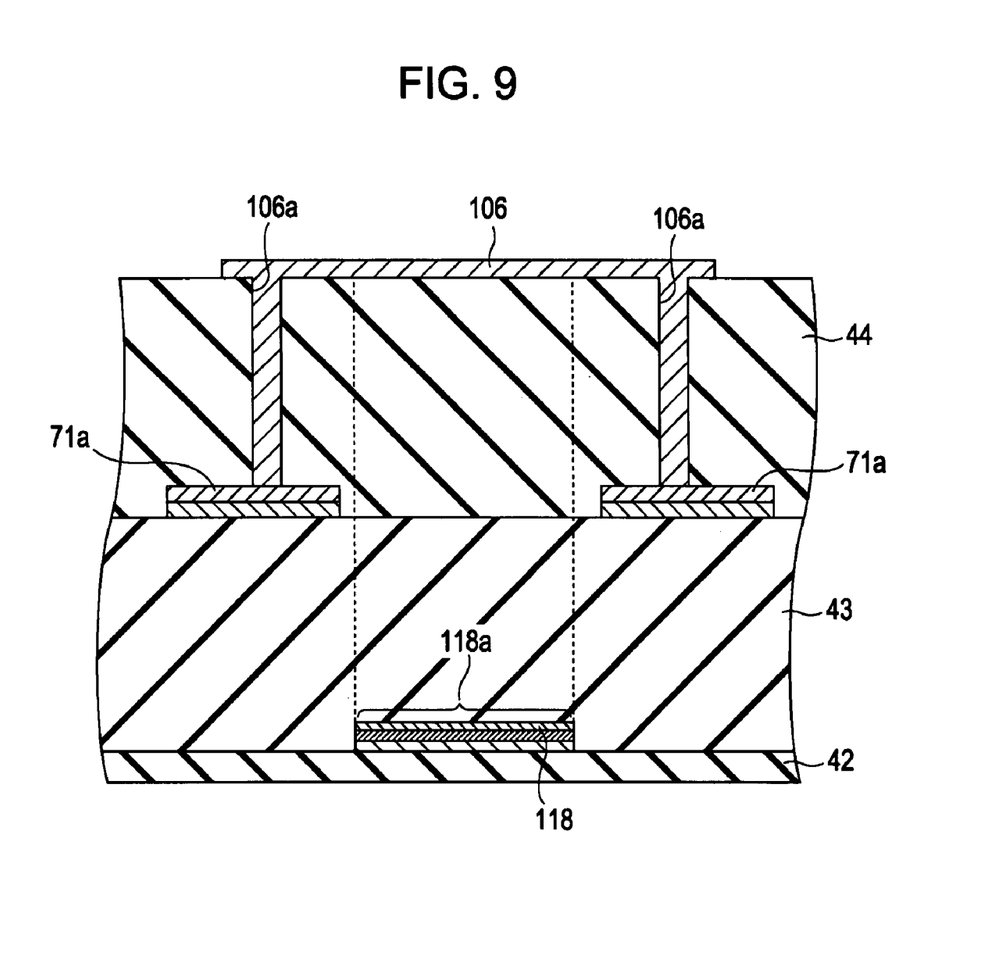
FIG. 9 is a sectional view taken along a line IX-IX of FIG. 8.

FIG. 8 is a plan view schematically showing a pattern and arrangement of one of the vertical conduction terminals, a corresponding one of the counter-electrode potential lines, and a corresponding one of the signal lines of the scanning-line driving circuits. FIG. 9 is a sectional view taken along a line IX-IX of FIG. 8. Furthermore, description will be made hereinafter for a case where portions of the signal lines 118 for the scanning-line driving circuits shown as an example of "peripheral circuit wiring" according to the embodiments of the invention are arranged so that the portions of the signal lines 118 for the scanning-line driving circuits are overlapped with the vertical conduction terminals 106. Here, description will be made for a configuration of the vertical conduction terminals 106, the counter-electrode potential lines 71, and the signal lines 118 for the scanning-line driving circuits.

As shown in FIGS. 8 and 9, the vertical conduction terminals 106 are arranged on an upper layer side relative to the fourth interlayer insulation film 44 which is included in a layer which is the same as that including the pixel electrodes 9a, and are made of the same layer as that used for the pixel electrodes 9a. Furthermore, at least the connection portions 71a of the counter-electrode potential lines 71 are arranged on an upper layer side relative to the third interlayer insulation film 43 which is included in a layer the same as that including the capacitance line 400 in the pixel portions, and are made of the same layer as that used for the capacitance line 400. The connection portions 71a of the counter-electrode potential lines 71 are electrically connected to the vertical conduction terminals 106 through contact holes 106a extending to the surface of the connection portions 71a penetrating through the fourth interlayer insulation film 44.

At least the overlapping portions 118a of the signal lines 118 for the scanning-line driving circuits are arranged on an upper layer side relative to the second interlayer insulation film 42 which is included in a layer the same as the layer including the data lines 6a in the pixel units, for example, and are made of the same layer as that used for the data lines 6a.

Accordingly, in the second embodiment, in the fabrication process of the liquid crystal device, in addition to the pixel electrodes 9a, the data lines 6a, and the capacitance line 400 in the pixel units on the TFT array substrate 10, the vertical conduction terminals 106, at least the overlapping portions 118a of the signal lines 118 for the scanning-line driving circuits, and at least the connection portions 71a of the counter-electrode potential lines 71 in the peripheral area on the TFT array substrate 10 may be arranged. Accordingly, the number of steps in the fabrication process may be reduced, and therefore, the fabrication process may be simplified.

Furthermore, on the TFT array substrate 10, since the connection portions 71a of the counter-electrode potential lines 71 are arranged on a layer different from that including the vertical conduction terminals 106, a pattern of the vertical conduction terminals 106 may be formed as island shapes as shown in FIG. 8 so as to be separated, in the vertical direction (the vertical direction in FIG. 9), from a surface of the TFT array substrate 10 and the connection portions 71a of the counter-electrode potential lines 71 in plan view. Accordingly, when the configuration of the second embodiment is compared with the configuration of the first embodiment in which the connection portions 71a of the counter-electrode potential lines 71 are integrally arranged on the layer the same as that including the vertical conduction terminals 106, the vertical conduction terminals 106 have lower resistance in the configuration of the second embodiment.

Furthermore, on the TFT array substrate 10, the connection portions 71a of the counter-electrode potential lines 71 are arranged at positions different from at least the overlapping portions 118a of the signal lines 118 for the scanning-line driving circuits. Accordingly, at positions where the vertical conduction terminals 106 are arranged on the TFT array substrate 10, spaces necessary for arranging the connection portions 71a of the counter-electrode potential lines 71 and the signal lines 118 for the scanning-line driving circuits may be made smaller. Consequently, the signal lines 118 for the scanning-line driving circuits may be arranged without taking the arrangement of the connection portions 71a of the counter-electrode potential lines 71 into consideration.

In the configuration in the sectional view shown in FIG. 9, the connection portions 71a of the counter electrode potential line 71 are interposed between the vertical conduction terminals 106 and the overlapping portions 118a of the signal lines 118 for the scanning-line driving circuits. In the fabrication process of the liquid crystal device, when the counter substrate 20 and the TFT array substrate 10 are sealed together, the vertical conduction members 107 are arranged between the counter substrate 20 and the TFT array substrate 10 at positions corresponding to the vertical conduction terminals 106, and further, the counter substrate 20 and the TFT array substrate 10 are sealed together by the seal member 52 in a pressing manner. When compared with the configuration of the first embodiment shown in FIG. 7 in which the overlapping portions 118a are arranged on a layer immediately under the layer including the vertical conduction terminals 106, the configuration of the second embodiment prevents more reliably the vertical conduction members 107 which are in contact with the vertical conduction terminals 106 from penetrating through the vertical conduction terminals 106 and being further brought into contact with the overlapping portions 118a of the signal lines 118 for the scanning-line driving circuits.

In the second embodiment described above, at least the connection portions 71a of the counter-electrode potential lines 71 and at least overlapping portions 118a of the signal lines 118 for the scanning-line driving circuits may be arranged in the same layer and further may be made of the same layer.

Electric Apparatus

Figure 10:
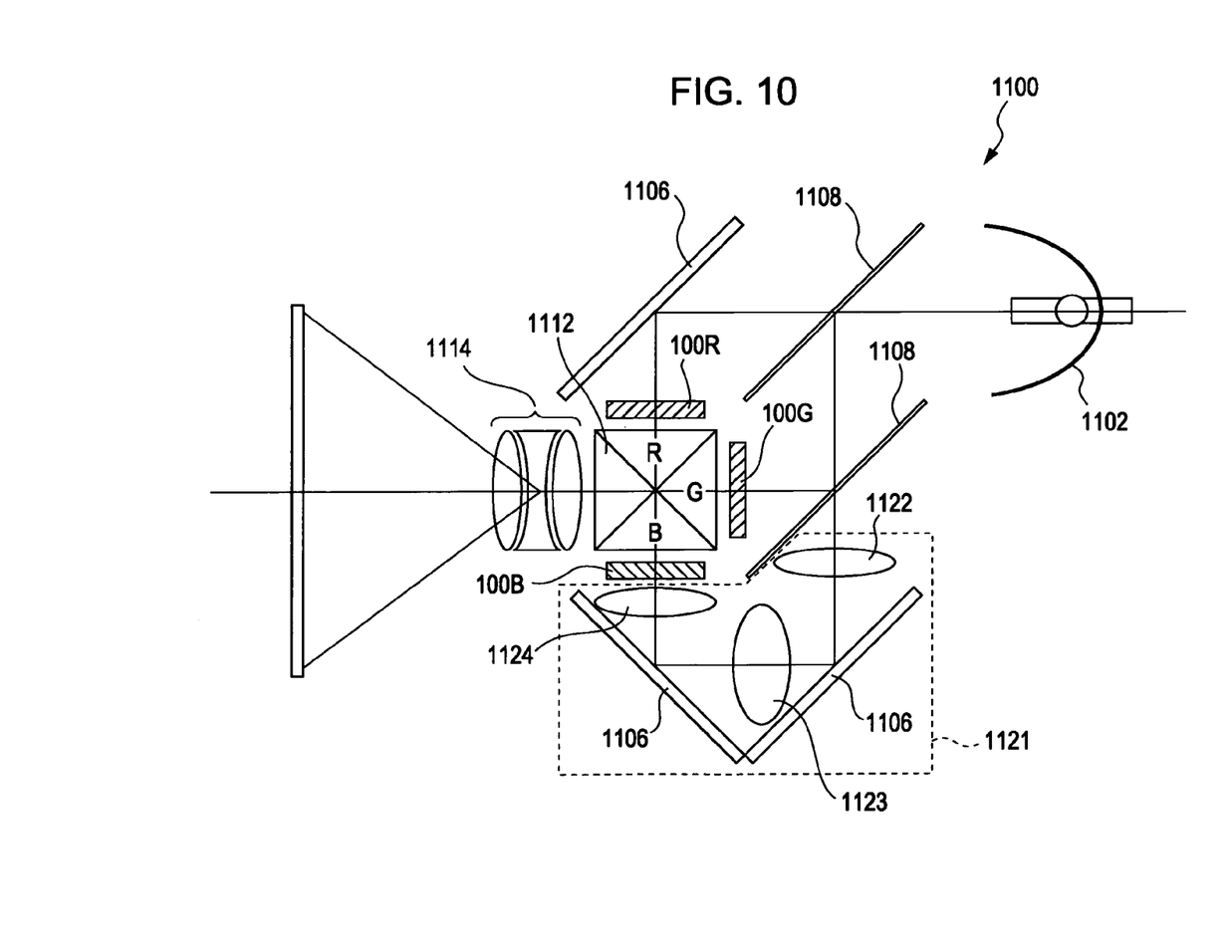
FIG. 10 is a sectional view schematically showing a color liquid crystal projector as an example of a projection type color display apparatus as an electronic apparatus according to an embodiment of the invention.

A projection-type color-display apparatus which is an example of an electric apparatus using the above-described electro-optical device as a light valve will be described in terms of configuration as a whole, particularly, in terms of optical configuration. FIG. 10 is a sectional view schematically showing a projection-type color-display apparatus.

In FIG. 10, a liquid crystal projector 1100 as an example of a projection-type color-display apparatus has three liquid crystal modules each of which includes a liquid crystal device having driving circuits arranged on a TFT array substrate, and the three liquid crystal modules are used as projectors having a light valve 100R for R color components, a light valve 100G for G color components, and a light valve 100B for B color components. In the liquid crystal projector 1100, when projection light is emitted from a lamp unit 1102 which is a white light source such as a metal halide lamp, the emitted light is divided into color components R, G, and B corresponding to R, G, and B three primary colors by means of three mirrors 1106 and two dichroic mirrors 1108. The color components R, G, and B are incident into the light valves 100R, 100G, and 100B, respectively. In this case, light having a B color component is incident into the light valve 100B through a relay lens system 1121 including an incident lens 1122, a relay lens 1123, and an emission lens 1124. The light components corresponding to the three primary colors modulated by the light valves 100R, 100G, and 100B are synthesized again by means of a dichroic prism 1112 and the synthesized light is projected on a screen through the a projection lens 1114 as a color image.

The invention is not limited to the embodiments described above, and modification may be made without departing from the scope and spirit of the invention written in the whole claims and specification. Furthermore, an electro-optical device in which such modification is made and an electronic apparatus including the electro-optical device are also within the scope of the invention.

The entire disclosure of Japanese Patent Application No. 2006-176304, filed June 27 is expressly incorporated by reference herein.

What is claimed is:

1. An electro-optical device comprising:
a counter substrate and an element substrate arranged so as to face each other;
liquid crystal in between the counter substrate and the element substrate;
a plurality of pixel electrodes arranged in a pixel area of the element substrate;
a counter electrode arranged between the liquid crystal and the counter substrate;
vertical conduction terminals arranged in a peripheral area located peripheral to the pixel area and which enable electrical conduction between the counter substrate and the element substrate;
peripheral circuit wiring arranged in the peripheral area, the peripheral circuit wiring having overlapping portions that overlap the vertical conduction terminals in plan view, the overlapping portions being arranged on a lower layer side relative to the vertical conduction terminals; and
lines and electronic elements which are arranged on a lower layer side relative to the pixel electrodes and are used for driving the pixel electrodes,
wherein the vertical conduction terminals are formed of a conductive film which is the same layer as a first conductive film selected from a plurality of conductive films forming the lines and the electronic elements, and
wherein the overlapping portions of the peripheral circuit wiring are formed of a conductive film which is the same layer as a second conductive film which is selected from the plurality of conductive films and arranged on a lower layer side relative to the first conductive film.

2. The electro-optical device according to claim 1, wherein the first conductive film and the second conductive film are metal films.

3. The electro-optical device according to claim 1,
wherein the vertical conduction terminals are formed of films, each of which is the same layer as that forming each of the pixel electrodes, and
wherein each of the overlapping portions of the peripheral circuit wiring is formed of a conductive film the same as any one of conductive films forming the lines and the electronic elements.

4. The electro-optical device according to claim 1, further comprising:
a counter-electrode potential line which is arranged in the peripheral area on the element substrate, to which a counter-electrode potential used to maintain the counter electrode at a predetermined potential is supplied, and which has connection portions electrically connected to at least the vertical conduction terminals, each of the connection portions being formed of the same layer as that forming each of the vertical conduction terminals.

5. The electro-optical device according to claim 1, further comprising:
a counter-electrode potential line which is arranged in the peripheral area on the element substrate, to which a counter-electrode potential used to maintain the counter electrode at a predetermined potential is supplied, and which have connection portions electrically connected to at least the vertical conduction terminals, each of the connection portions being arranged on a lower layer side relative to the vertical conduction terminals,
wherein the connection portions of the counter-electrode potential line are electrically connected to the vertical conduction terminals through a contact hole which penetrates through an interlayer insulation film used for insulation between the connection portions and the vertical conduction terminals.

6. The electro-optical device according to claim 5,
wherein at least the connection portions of the counter-electrode potential line are arranged in a layer different from a layer including the overlapping portions of the peripheral circuit wiring.

7. The electro-optical device according to claim 6,
wherein at least the connection portions of the counter-electrode potential line are arranged in an upper layer side relative to the overlapping portions of the peripheral circuit wiring.

8. The electro-optical device according to claim 5,
wherein at least each of the connection portions of the counter-electrode potential line is made of a film which is the same layer as that selected from a plurality of conductive films used to form the lines and the electronic elements.

9. An electronic apparatus including an electro-optical device set forth in claim 1.

* * * * *